United States Patent
Sarma et al.

[19]

[11] Patent Number: 6,101,429
[45] Date of Patent: Aug. 8, 2000

[54] BROAD-RANGE, MULTI-DIRECTIONAL AIRCRAFT AIRSPEED MEASURING SYSTEM

[75] Inventors: Garimella Ramakrishna Sarma, Newport News; Sivaramakrishman M. Mangalam, Williamsburg, both of Va.

[73] Assignee: Tao of Systems Integration, Inc., Williamsburg, Va.

[21] Appl. No.: 09/056,328

[22] Filed: Apr. 7, 1998

[51] Int. Cl.[7] .................................................. G01C 21/10
[52] U.S. Cl. ................................................ 701/7; 702/45
[58] Field of Search ........................... 701/7, 14; 702/45, 702/47; 73/181, 204.11, 861.61; 244/53 B

[56] References Cited

U.S. PATENT DOCUMENTS

| | | | |
|---|---|---|---|
| 3,906,792 | 9/1975 | Miller | 73/213 |
| 4,300,200 | 11/1981 | Doe | 364/565 |
| 4,437,343 | 3/1984 | Dixon et al. | 73/182 |
| 4,483,191 | 11/1984 | Nkamura | 73/187 |
| 4,766,767 | 8/1988 | Hassenpflug et al. | 73/181 |
| 4,794,793 | 1/1989 | Favre et al. | 73/178 H |
| 5,063,777 | 11/1991 | Arethens et al. | 73/178 H |
| 5,214,596 | 5/1993 | Müller | 364/565 |
| 5,299,455 | 4/1994 | Mangalam | 73/180 |
| 5,423,209 | 6/1995 | Nakaya et al. | 73/182 |
| 5,756,891 | 5/1998 | Nakaya et al. | 73/147 |
| 5,797,105 | 8/1998 | Nakaya et al. | 701/7 |

*Primary Examiner*—Tan Nguyen
*Attorney, Agent, or Firm*—Kaufman & Canoles

[57] ABSTRACT

A broad-range, multi-directional aircraft airspeed measuring system is provided. The airspeed measuring system has multiple vortex generating probes located within a venturi section. At least one rearward facing probe and one forward facing probe are included. Additional probes can be added to extend the high speed range of the airspeed indicator. A splitter plate or plates separate flow channels from each other to provide a separate flow channel for each vortex probe. Each vortex probe has a hot film sensor and anemometer.

10 Claims, 10 Drawing Sheets

BROAD-RANGE, MULTI-DIRECTIONAL AIRCRAFT AIRSPEED MEASURING SYSTEM

FIELD OF THE INVENTION

The invention is related to aircraft instrumentation and in particular to airspeed measuring devices.

BACKGROUND OF THE INVENTION

Aircraft airspeed measurements are required for aerodynamic control, providing indicated airspeeds for stall speeds, landing speeds, never-exceed speeds, and true airspeeds for navigation, weapons release ballistics and a variety of other uses. Typically, aircraft speed is measured by pitot-static systems which provide indicated airspeed, that is, the ram or dynamic pressure compared to the static pressure for the particular altitude. The indicated airspeed provides information to the pilot for aerodynamic speed control to set such speeds as landing speed, best glide speed, maneuvering speeds and other aerodynamic speeds.

Indicated airspeeds are dependent on air density and may be significantly different from true airspeed. True airspeed is required to determine the actual path of the aircraft, for example, navigation, intercepts, bomb delivery, etc. Prior art systems generally measure indicated airspeed and use an air data computer or other calculating means to determine true speed. Several problems arise with the existing airspeed devices. First, measurement accuracy is dependent on the alignment of the pitot head with the incoming airflow. At large yaw angles or at high angles of attack, significant errors are introduced. Additionally, the operating range of the pitot-static system is limited. At low air speeds, the dynamic-static pressure differences are too small for accurate readings. Typically below approximately 30 knots, pitot-static systems become unusable. A system is needed which can produce accurate results over a speed range from near zero to 250 Kts and which can accept freestream flow angle changes up to 30 degrees. The lower speed range is necessary for accurate weapons delivery and flight control for hovering or slow moving aircraft and the angle range is necessary to provide accuracy over the angle-of-attack and side-slip operating envelope of a typical combat aircraft.

Numerous devices have been developed to measure the low speed operation of aircraft. Typically, these devices calculate indicated airspeed using complex computations of main rotor longitudinal and lateral cyclic pitch positions, along with collective pitch and tail rotor pitch. These devices typically require additional input data, such as inertial acceleration, inertial velocity, and wind velocity. The complexity, cost and weight of these types of systems have prevented the wide-spread acceptance of these systems.

A simple, low cost system is needed which can provide accurate data over a broad range of airspeeds and directions.

SUMMARY OF THE INVENTION

It is an object of this invention to provide an aircraft airspeed system having an operating range between zero and 250 knots during forward flight.

It is another object of the invention to provide an aircraft airspeed system having an angular operating range of ±30° in both yaw and angle-of-attack during forward flight.

It is yet another object of the invention to provide an aircraft airspeed system having an operating range of zero to 100 knots during rearward flight.

It is still another object of the invention to provide an aircraft airspeed system having an angular operating range of ±30° in both yaw and angle-of-attack during rearward flight.

It is a further object of the invention is to provide an aircraft airspeed system having an accurate true airspeed indication independent of altitude and ambient temperature.

It is a further object of the invention to provide an aircraft airspeed system producing inherently dominant and discrete vortex shedding frequencies through the operational speed range.

In accordance with the foregoing and other objects, the present invention is a broad-range, multiple-directional airspeed system. The system has a venturi tube for mounting on an aircraft with the flow axis of the tube aligned with the longitudinal axis of the aircraft array. Inside the venturi tube, a pair of wedges are mounted side-by-side, but separated with a splitter plate. An additional pair of wedges also separated by splitter plates are optionally stacked within the venturi tube to provide extended speed range for the airspeed system. One wedge has an apex edge facing toward the forward end of the venturi tube and the other wedge has an apex edge facing toward the rearward end of the venturi tube. On each wedge, hot-film sensors are located to measure the frequency of shed vortices. The signal voltages from the hot-film sensor containing the shed vortices frequency is sent to a digital-signal processor for calculation of true airspeed, through an anemometer system. An alternate version of the system has a dual-tube configuration, one tube providing a venturi-effect and one tube having a substantially constant cross-section. The dual-tube configuration increases the useful speed range of the measurement system by providing accelerated airflow in the converging-diverging tube for the low speed range, and unaccelerated freestream flow in the constant cross-section tube.

The system provides true airspeed independent of density and temperature. Thereafter, the processed data is displayed on a cockpit display and provided to the aircraft's weapons computer. Additional processing, using static pressure from static ports or existing altimeter systems, provides indicated airspeed without the use of pitot or ram pressure sensors. The probe can be replaced quickly when needed without any extra calibration. Provision of multiple hot-films on the wedge create abundant redundancy on balance reliability.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
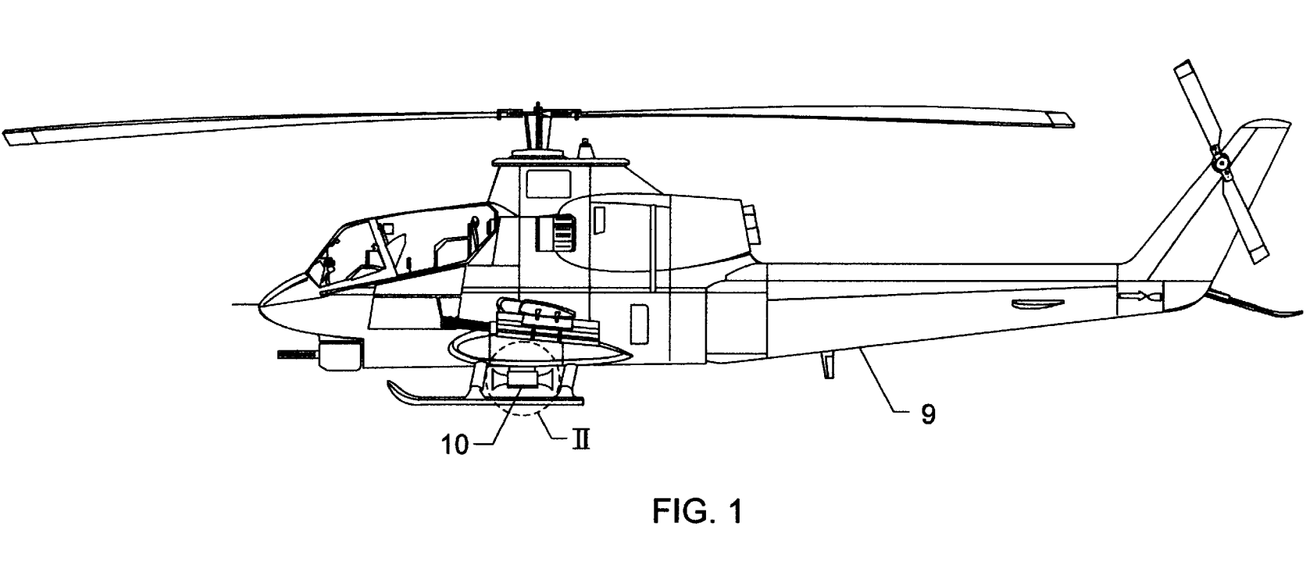
FIG. 1 is a side view of the airspeed measurement system shown mounted on a representative aircraft.

Referring now to FIG. 1, the airspeed measuring system of the present invention, designated generally by the reference numeral 10, is shown mounted on a representative aircraft 9 aligned with the aircraft's longitudinal axis. The system 10 and sensor assembly located within dashed circle II are shown in greater detail in FIG. 2.

Figure 2:
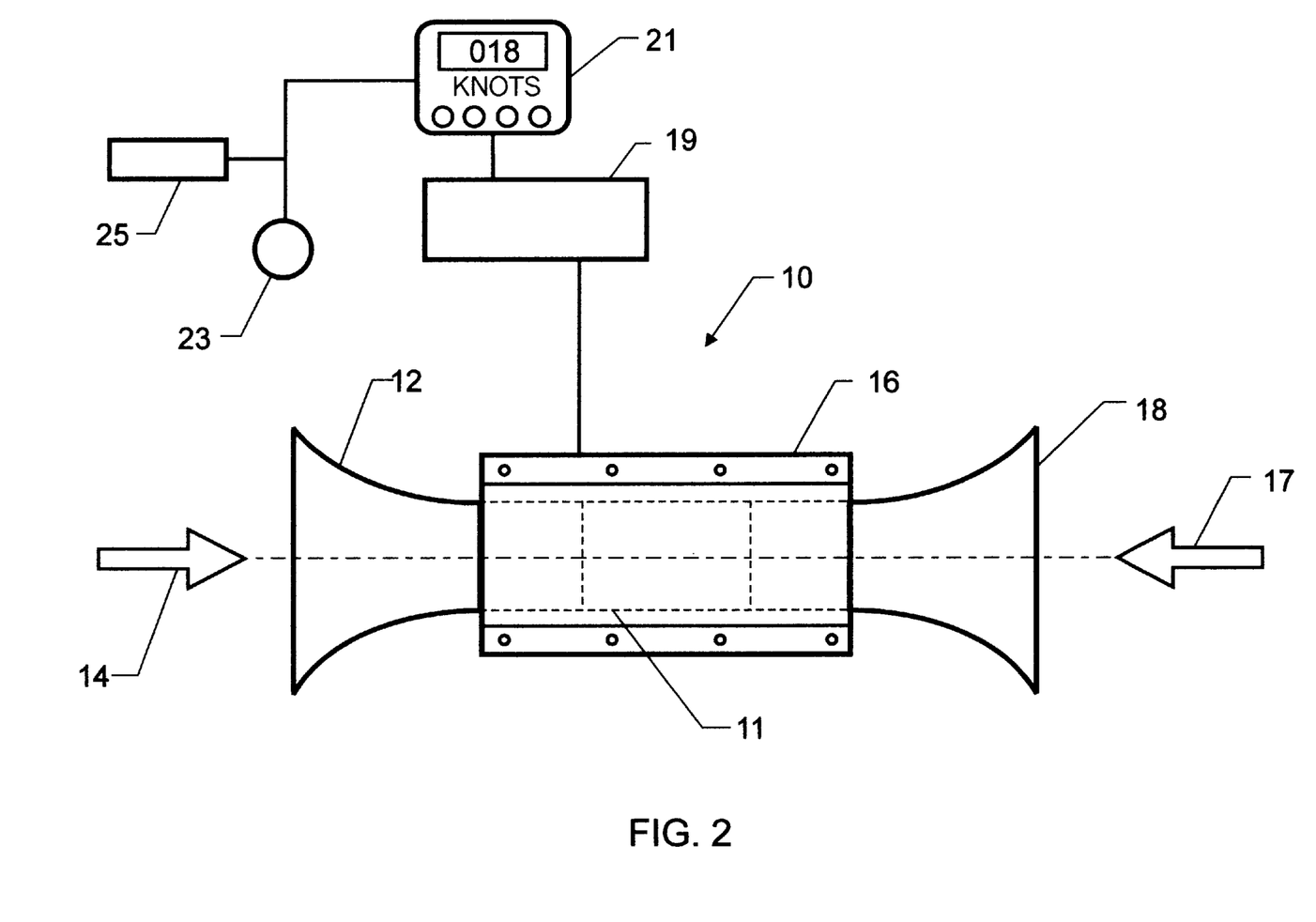
FIG. 2 is a side view of the sensor assembly of the invention with a schematic representation of the processing and display units.

FIG. 2 shows the venturi tube 11 enclosed in the mounting bracket 16 and additional components located within the aircraft. A forward facing bellmouth 12 is attached to the venturi tube 11 on a forward end for receiving the airflow 14 during forward flight of the aircraft. Additionally, a rearward facing bellmouth 18 is attached to the rearward end of venturi tube 11 for receiving the airflow 17 created by rearward flight of the aircraft. From the hot-film sensors within the venturi tube 11, voltage signals are processed using hot-film anemometers and digital signal processor (DSP) unit 19. Thereafter, signals are sent to the cockpit display unit 21. The processed data provide true airspeed to the cockpit display 21. Processing within the cockpit display 21 allows for the calculation of indicated airspeed (from the true airspeed) using readings from a static port 23 or from onboard alitimetry instruments 25.

Figure 3:
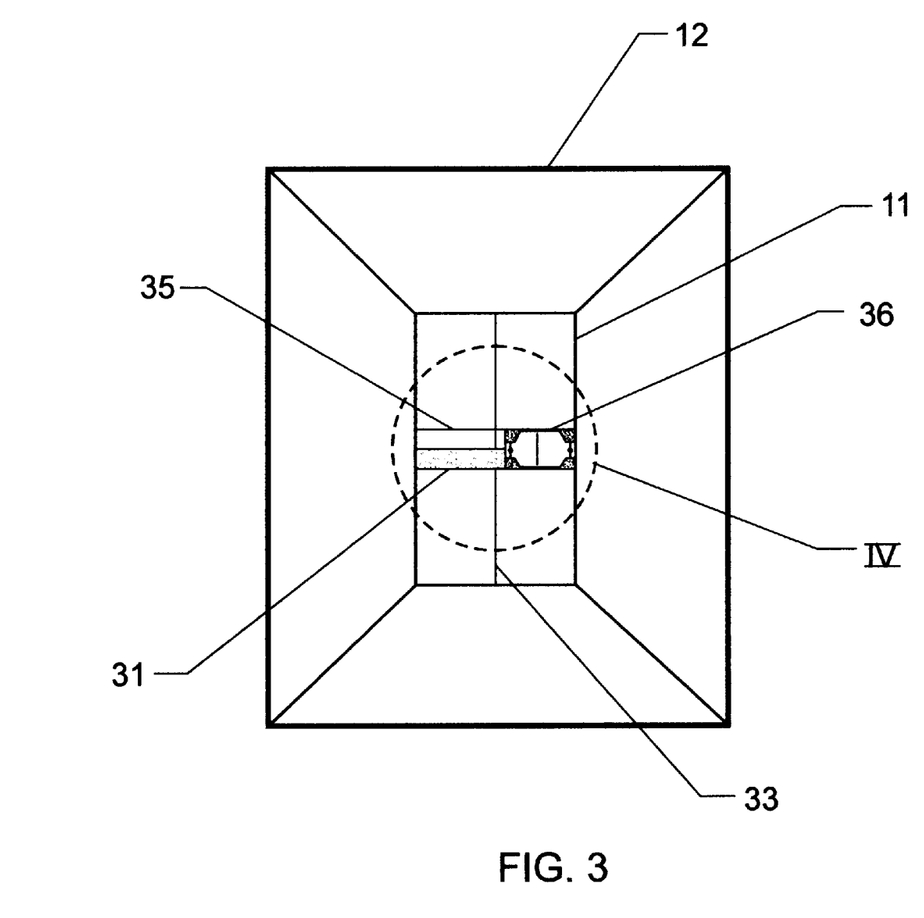
FIG. 3 is a front view of the venturi and sensor assembly.

Referring now to FIG. 3, a front view of the venturi tube 11 and the forward bellmouth 12 shows the sensor assembly 31 within dashed circle IV. The sensor assembly 31 comprises two wedge probes separated by a splitter plate 33, a forward facing wedge 36 and a rearward facing wedge 35. The details within dashed circle IV may be seen more clearly in FIG. 4.

Figure 4:
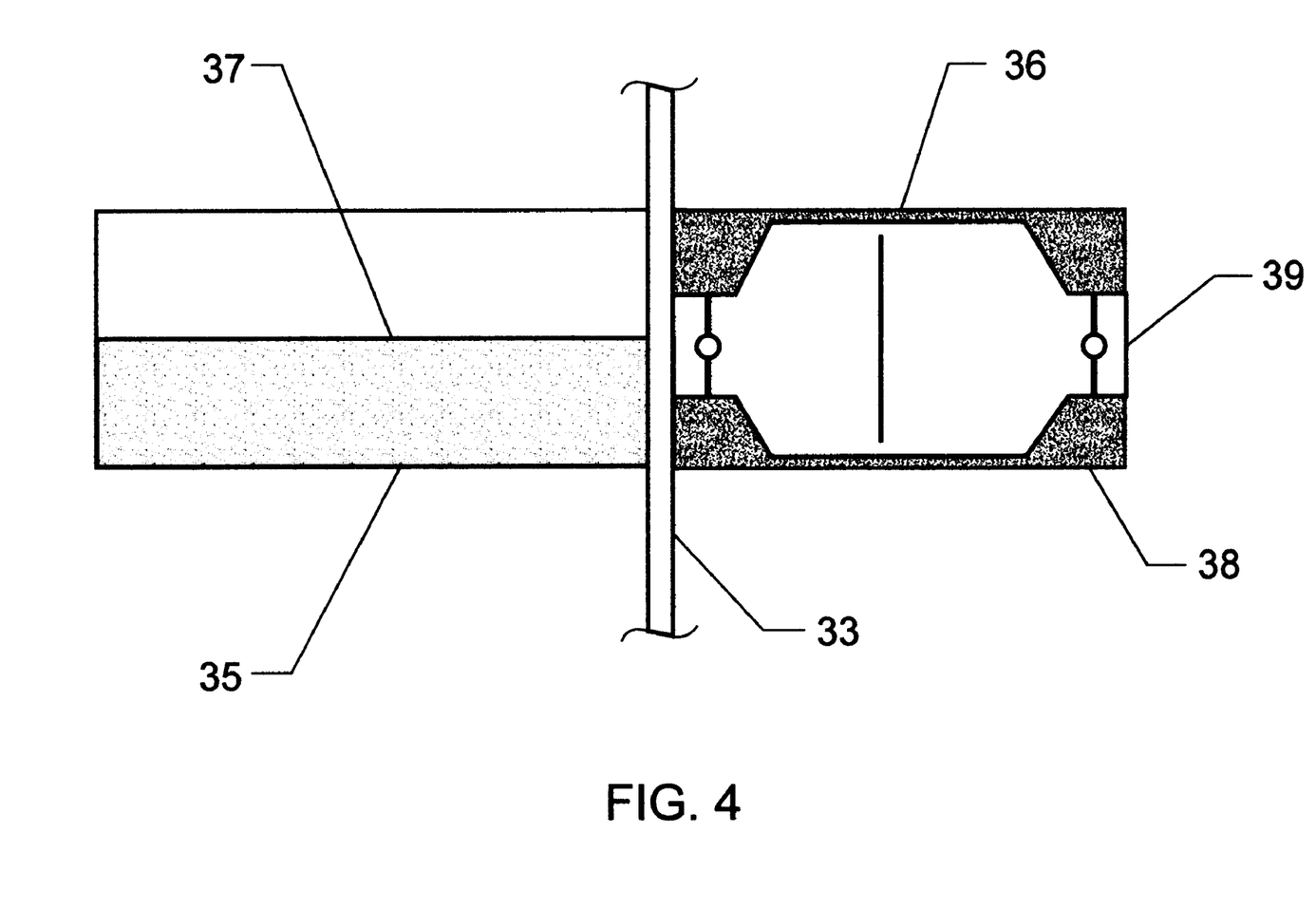
FIG. 4 is an enlarged front view of the wedges within the venturi tube.

FIG. 4, a view looking from the front of the venturi tube, shows the splitter plate 33 separating the forward facing wedge 36 and the rearward facing wedge 35. The forward facing wedge 36 is formed in the shape of an isosceles triangle having a flat base facing the airflow and a right angle apex facing rearward. The right angle apex 37 on the rearward facing wedge 35 faces the forward end of the venturi tube. An isosceles is not required within the scope of the invention. Any probe shape which produces discrete and dominant shed vortices can be used. For example, cylindrical probes can be used without the venturi by placing the probes in an area of accelerated flow around an existing aircraft structure. The forward facing wedge 36 shows the flat base 39 having two hot-film sensors 38 attached. Both wedges are identical having hot-film sensors on the flat bases and 900 apexes facing the downstream direction of the flow.

Figure 5:
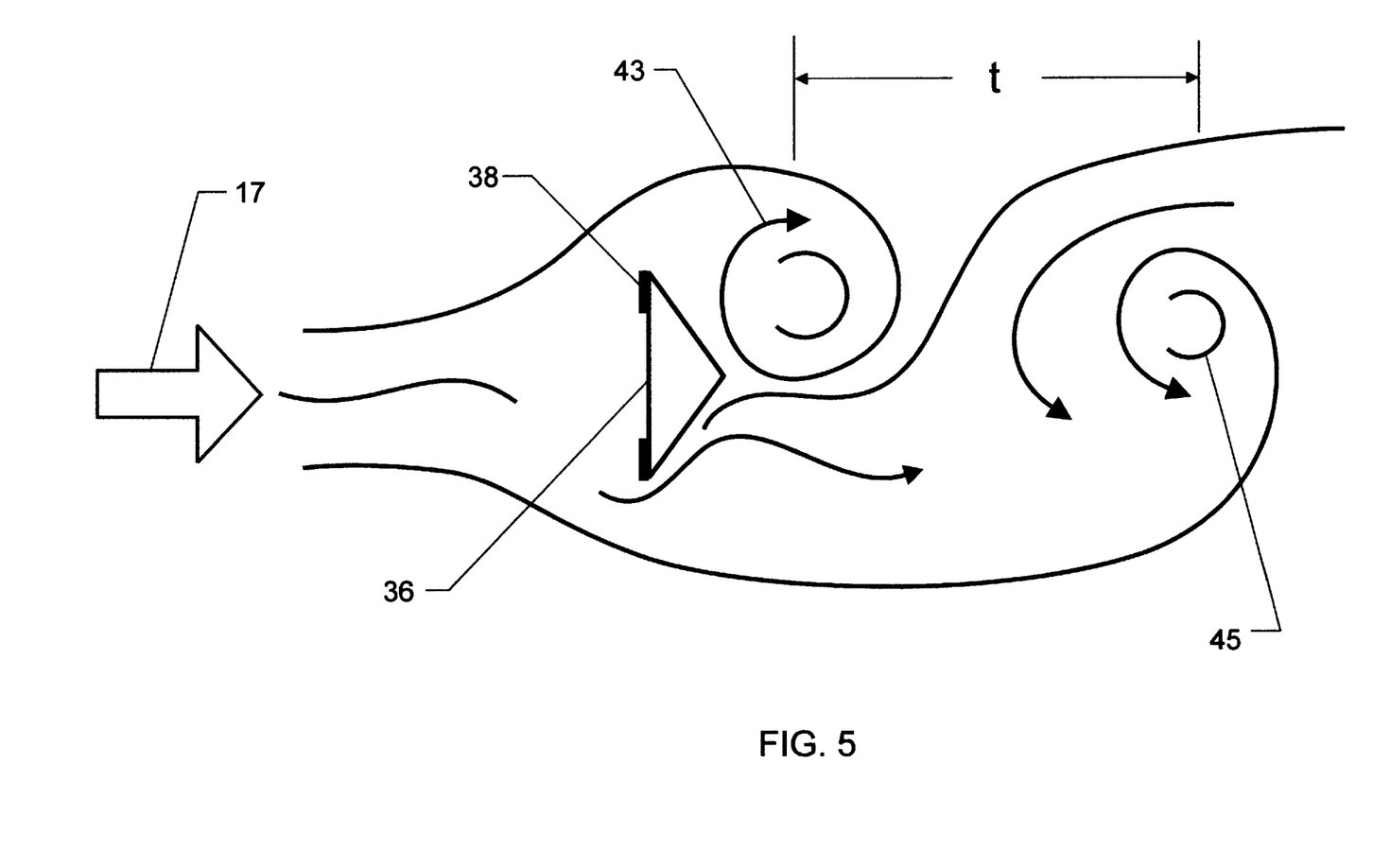
FIG. 5 is a side view of the wedge sensor in operation.

Operation of the wedge 36 and sensor 38 may be seen in FIG. 5. As air 17 moves around the wedge 36, well-defined vortices 43 and 45 are detached from the rear edges of the wedge 36. The vortex flow is sensed by the hot film sensor 38 connected to an anemometer which produces a signal voltage matching the vortex shedding frequency, f, corresponding to the interval t shown between vortices. A voltage or current signal provides the frequency f of shed vortices from the wedge 36 and the flow velocity may then be determined by the relationship $$U = (k)(d)(f)$$

where:

k=a dimension-less constant independent of fluid density and velocity d=the cross sectional dimension of the wedge (m)

f=frequency (Hz) of the shed vortices.

Figure 6:
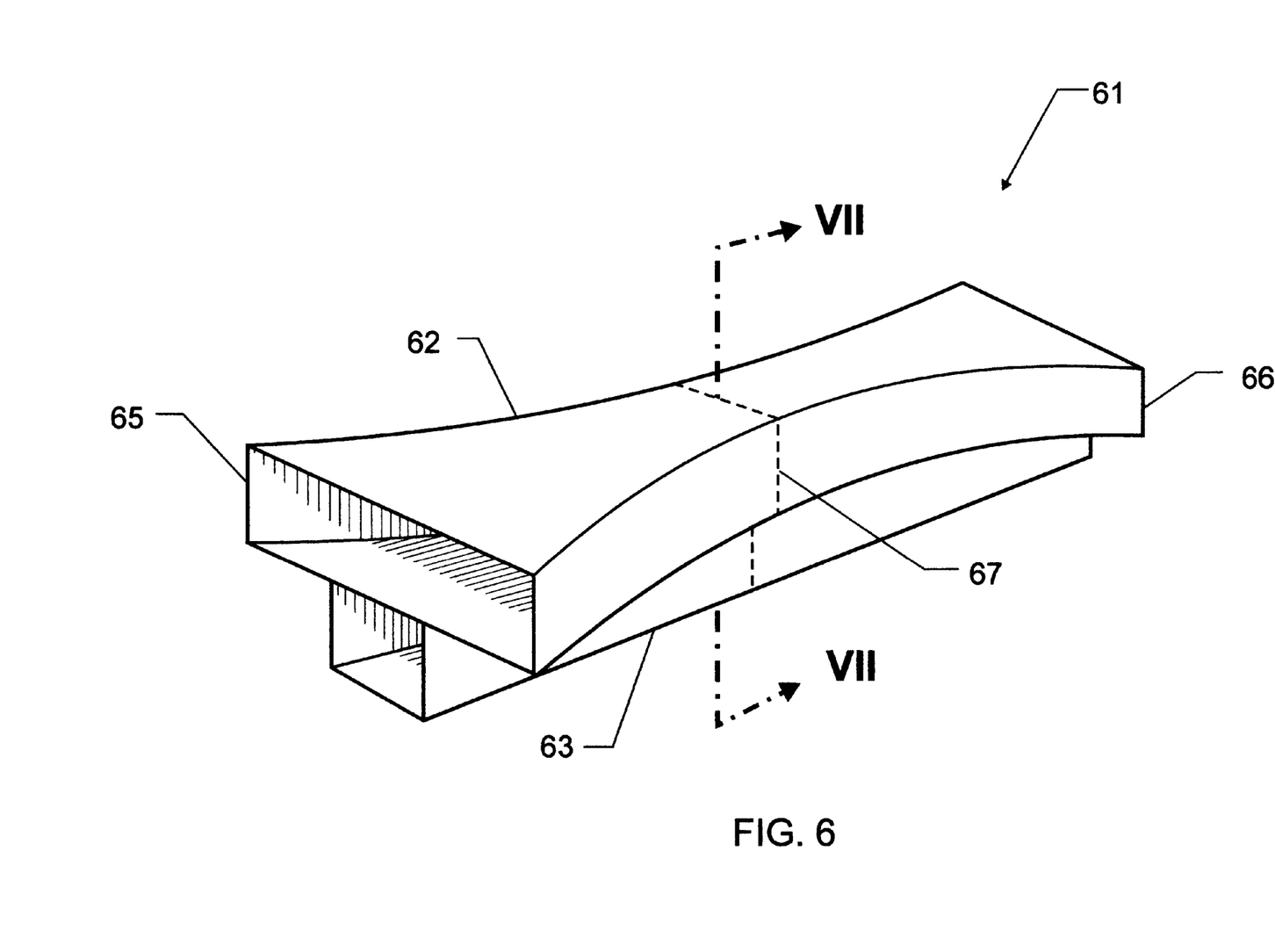
FIG. 6 is a perspective view of a dual-venturi embodiment of the invention.

Referring now to FIG. 6, a dual-venturi tube configuration 61 of the airspeed measurement system is shown. A first tube comprising a two-dimensional conveying-diverging tube 62 and a second tube 63 having a relatively constant cross-section and little or no convergence. Tube 62 is attached to the underside of an aircraft fuselage as previously described and tube 63 is attached to the underside of tube 62. The upper venturi tube 62 has a wide-mouth inlet 65 and exit 66. At the center of the upper venturi tube 62, a throat section 67 provides the highest flow velocity and the location of the sensor wedge probes 35 and 36. This throat section 67 accelerates the free stream air sufficiently to provide vortex shedding at a freestream velocity of approximately one knot. At the same time, acceleration of the airflow at high freestream velocities can cause choked flow prior to the design maximum of 250 knots true airspeed. During this speed regime, true airspeed is measured in the relatively straight tube 63 where little acceleration of the freestream flow occurs. The cross-section VII of the throat region may be seen in FIG. 7.

Figure 7:
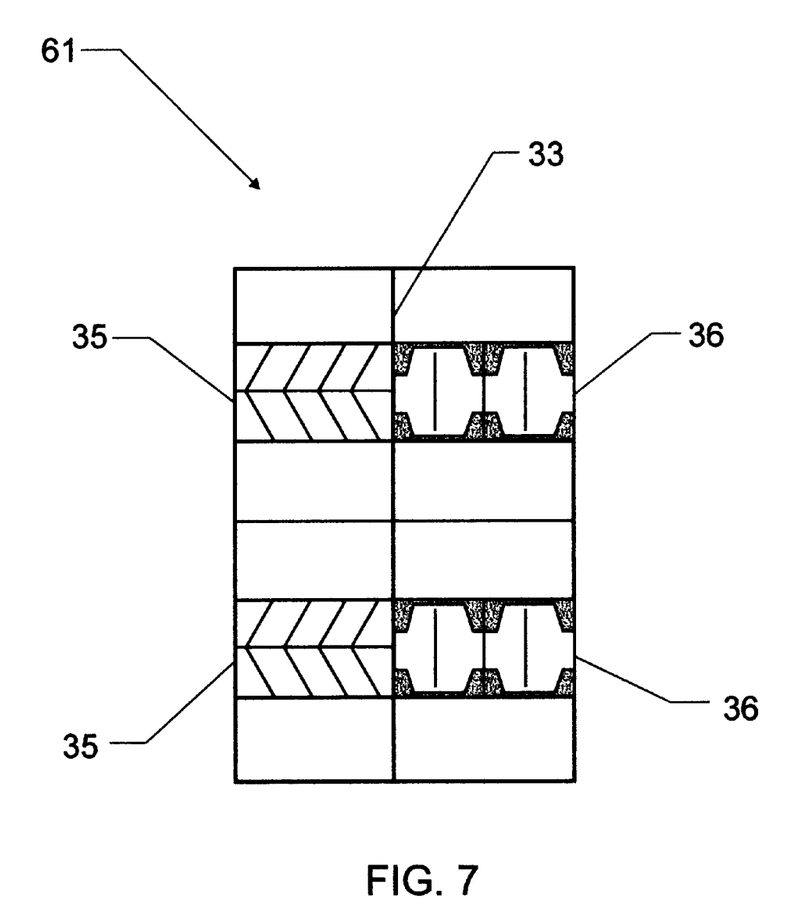
FIG. 7 is a cross-sectional front view of the dual-venturi embodiment.

FIG. 7 is a cross-sectional front view of the dual-venturi configuration 61 taken at the throat section 67. Because of the convergence of the inlet 65, airflow passing through the throat section 67 is accelerated to approximately three times freestream velocity. This acceleration feature allows accurate airspeed measurement at very low freestream velocities, down to approximately 1.0 knots with accuracies of approximately 0.1 knots. Forward facing wedges 36, rearward facing wedges 35 and the splitter plate 33 are shown for reference.

Figure 8:
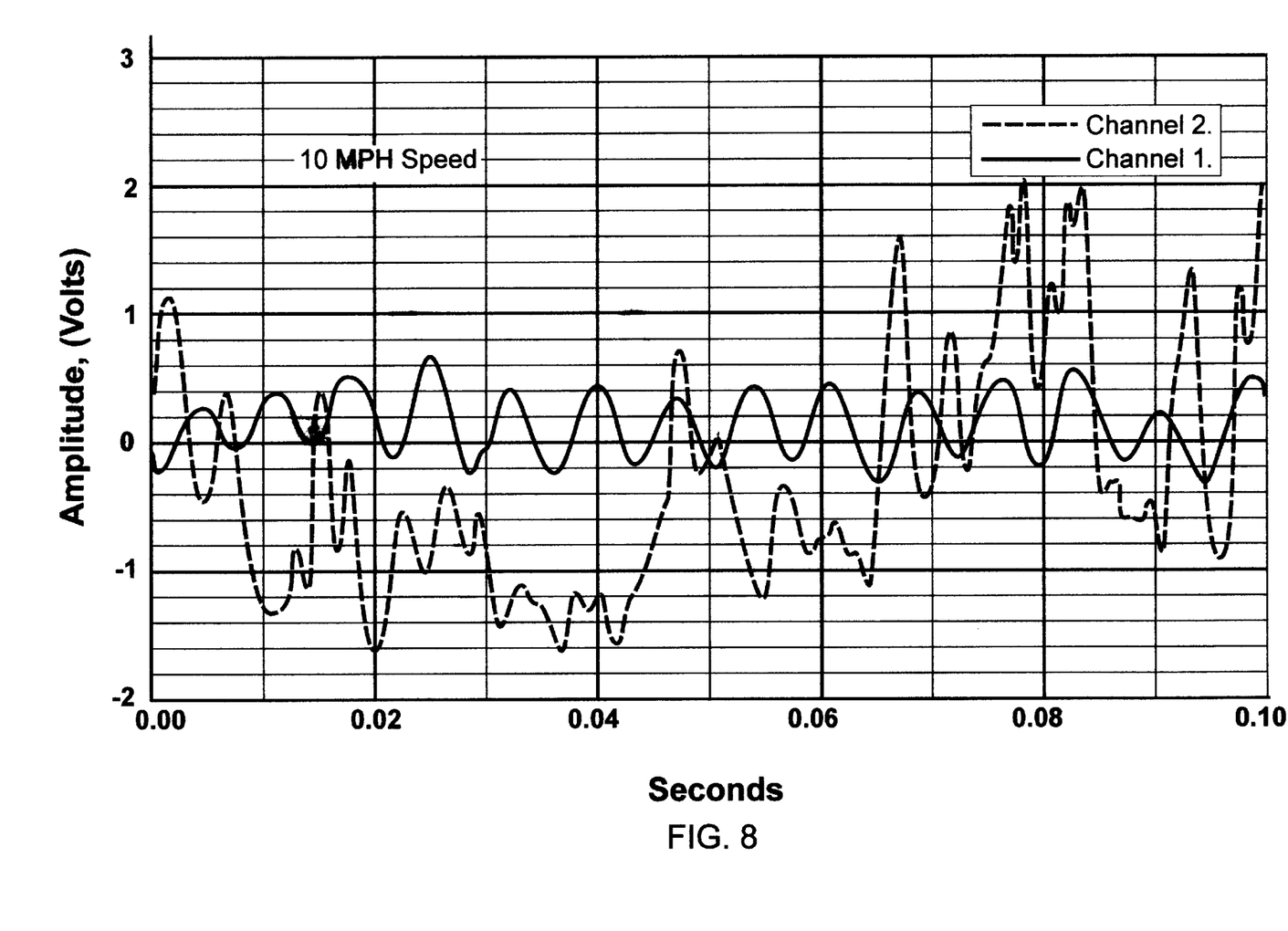
FIG. 8 is a graphical depiction of the signals generated by the hot film anemometers for a low airspeed.

Typical signals obtained from the hot-film sensors for an airspeed of 10 miles per hour are shown in FIG. 8. The voltage variations represent the frequency of vortex detachment from the wedge. Channel 1 is the forward facing wedge (flat face to the flow). Channel 2 is the rearward facing wedge which shows well-defined flow frequency during rearward flight, but irregular voltages as shown here, during forward flight.

Figure 9:
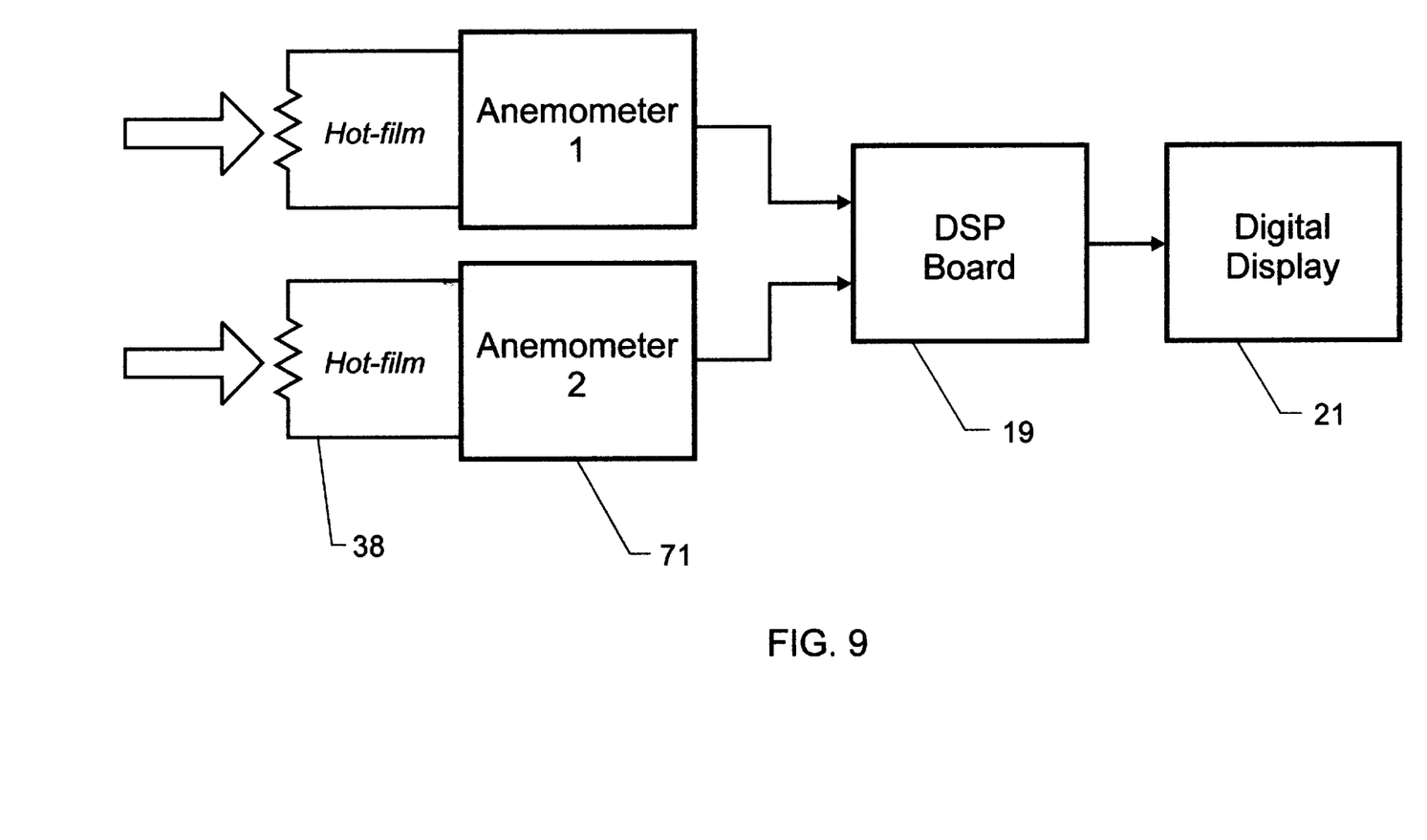
FIG. 9 is a schematic view of the essential components of the airspeed measurement system.

FIG. 9 is a schematic view of the essential components of the airspeed measurement system 10. The hot film sensor 38 is operated by anemometer 71 using constant voltage methods while measuring voltage changes. The digital signal processor (DSP) 19 calculates true airspeed based on shed vortex frequency reported by the hot-film film sensor. True airspeed is then displayed on cockpit display unit 21. While, for purposes of illustration, the invention shows discrete components to perform the various signal processing and control required to operate the hot-film sensors, in the preferred embodiment, a single circuit board incorporates all necessary processing. Additionally, hot wire may be substituted for the hot-film sensors.

Figure 10:
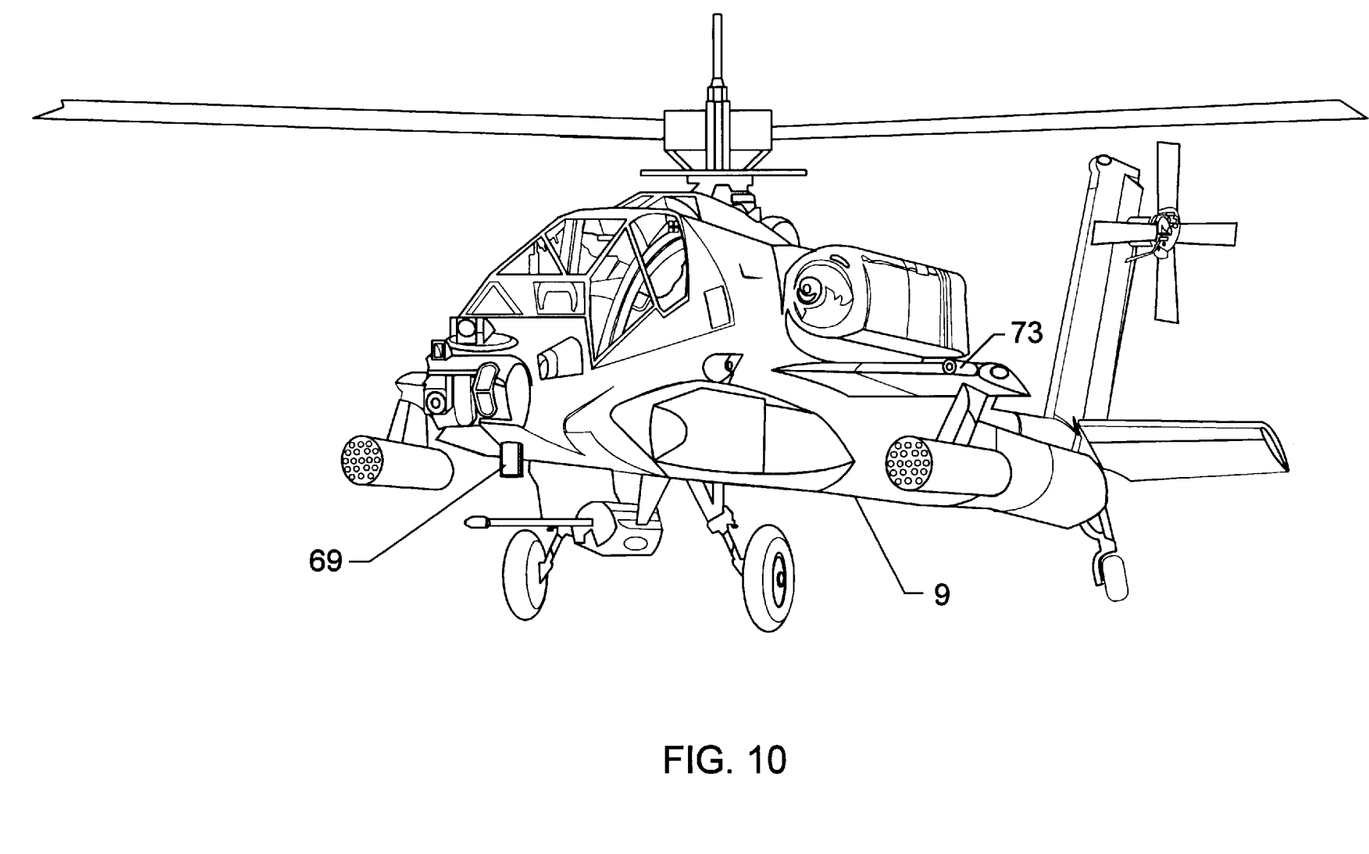
FIG. 10 is a perspective view of the aircraft showing two alternate embodiments.

FIG. 10 shows two alternate embodiments of the invention installed on the helicopter 9. The probe 69 in one embodiment is a cylindrical probe located in an area of accelerated flow due to the shape of the fuselage. In this embodiment, it is not necessary to provide dual probes as the cylinder creates the necessary vortex pattern with airflow from any direction. A further alternative includes an internal installation having an internal venturi tube 73 having bi-directional probes as previously described.

The features and advantages of the present invention are numerous. The system is a broad range, multi-directional airspeed measuring system operating from very low airspeeds, near zero, by providing both forward and rearward facing bellmouths to produce a known acceleration of the flow prior to measurement. This acceleration results in shed vortices around the sensor with very slow aircraft movement, approximately 1.0 knots. The shed vortex frequency is dependent only on velocity and is independent of density and temperature. As a result, no correction is necessary for altitude and ambient temperature and true airspeed can be measured directly.

Although the invention has been described relative to a specific embodiment thereof, there are numerous variations and modifications that will be readily apparent to those skilled in the art in the light of the above teachings. Specifically, sensors may be substituted, probe shapes may be modified and components may be combined. It is therefore to be understood that, within the scope of the appended claims, the invention may be practiced other than as specifically described.

What is claimed as new and desired to be secured by Letters Patent of the United States is:

1. A broad-range, multi-directional aircraft airspeed measuring system comprising:
   means for measuring true airspeed in forward and rearward flight, wherein said means for measuring true airspeed comprises:
      a first wedge having a forward facing apex and a rearward facing base, and
      a second wedge having a rearward facing apex and a forward facing base;
   means for accelerating airflow attached to said means for measuring true airspeed;
   a processor unit attached to and receiving signals from said means for measuring true airspeed; and
   a cockpit display unit connected to said processor unit.

2. A broad-range, multi-directional aircraft airspeed measuring system as in claim 1 wherein said means for measuring true air speed comprises a venturi tube having a flow axis aligned with a aircraft's longitudinal axis.

3. A broad-range, multi-directional aircraft airspeed measuring system as in claim 1 wherein said means for measuring true air speed comprises hot film sensors attached to the bases of said first and second wedges.

4. A broad-range, multi-directional aircraft airspeed measuring system as in claim 1 wherein said means for accelerating airflow comprises a forward facing bellmouth attached to said means for measuring said true airspeed.

5. A broad-range, multi-directional aircraft airspeed measuring system as in claim 1 wherein said means for accelerating airflow comprises a rearward facing bellmouth attached to said means for measuring said true airspeed.

6. A broad-range, multi-directional aircraft airspeed measuring system comprising:
   a mounting bracket for attachment to a aircraft;
   a venturi tube having forward and rearward ends and attached to said mounting bracket;
   a forward facing bellmouth connected to the forward end of said venturi tube;
   a rearward facing bellmouth connected to the rearward end of said venturi tube;
   a splitter plate located within said venturi tube;
   a first wedge having a rearward facing apex opposite a flat base and located on a first side of said splitter plate;
   a second wedge having a forward facing apex opposite a flat base and located on a second side of said splitter plate;
   a first hot film sensor located on the flat base of said first wedge;
   a second hot film sensor located on the flat base of said second wedge;
   a first anemometer connected to said first hot film sensor;
   a second anemometer connected to said second hot film sensor;
   a digital signal processor connected to said first and second anemometers;
   a cockpit display unit connected to said digital signal processor; and
   a static port connected to said cockpit display unit.

7. A broad-range, multi-directional aircraft airspeed measuring system as in claim 1 wherein said means for measuring true airspeed is a cylindrical probe.

8. A broad-range, multi-directional aircraft airspeed measuring system as in claim 1 wherein said means for accelerating airflow is a portion of an aircraft structure.

9. A broad-range, multi-directional aircraft airspeed measuring system as in claim 8 wherein the aircraft structure is the aircraft fuselage.

10. A broad-range, multi-directional aircraft airspeed measuring system as in claim 1 wherein said means for accelerating airflow is an internal venturi tube mounted within an aircraft structure.

* * * * *